United States Patent [19]
Mandel

[11] 3,828,446
[45] Aug. 13, 1974

[54] PROCESS FOR ACCELERATING THE LEARNING OF LANGUAGES

[75] Inventor: Marc Jean-Christophe Noël Mandel, Paris, France

[73] Assignee: L'Institut De Researches Economiques Et Sociales, Paris, France

[22] Filed: Apr. 21, 1972

[21] Appl. No.: 246,323

[52] U.S. Cl. .................................. 35/35 C, 179/1 N
[51] Int. Cl. ............................................ G09b 19/06
[58] Field of Search ....... 35/1, 8 R, 9 R, 35 R, 35 A, 35/35 C; 179/1 SB, 1 N, 1 VC, 1 VS, 1 SA; 272/14

[56] References Cited
UNITED STATES PATENTS

| | | | |
|---|---|---|---|
| 2,416,353 | 2/1947 | Shipman et al. | 35/1 |
| 2,533,010 | 12/1950 | Henabery | 35/1 |
| 3,101,390 | 8/1963 | Maille | 179/1 N |
| 3,596,378 | 8/1971 | Flubacker | 35/35 C |

FOREIGN PATENTS OR APPLICATIONS

| | | | |
|---|---|---|---|
| 1,422,286 | 9/1969 | Germany | 35/35 C |

Primary Examiner—Robert W. Michell
Assistant Examiner—Vance Y. Hum
Attorney, Agent, or Firm—Silverman & Cass

[57] ABSTRACT

Process and apparatus for accelerating learning of languages whereby the individual is made to acquire a phonation curve pertaining to the foreign language to be learned. The process comprises converting the phonation curve of the vocal emissions of the individual into electrical signals and, in a first stage of learning, modifying the phonation curve by a first selective filtering of the signals, so as to produce a first audition curve having an energy level which is roughly constant as a function of the frequency, this audition curve being heard by the individual whereby he acquires a transformed phonation curve similar to the audition curve obtained and, in a second stage of learning, modifying the transformed phonation curve in such manner as to obtain a second audition curve whose form reproduces the phonation curve of the language to be learned, the second audition curve being heard by the individual whereby he acquires the phonation curve of the language to be learned. A recording of vocal emissions spaced apart in time can be employed in addition in combination with reproducing means whereby the individual may repeat the recorded emissions in the intervals between recordings instead of reading from a text.

5 Claims, 9 Drawing Figures

PROCESS FOR ACCELERATING THE LEARNING OF LANGUAGES

The present invention relates to a process and an apparatus for accelerating the learning of languages.

Various scientific investigations have shown that the spectrum of the frequencies of the human voice is practically determined by the spectrum of the frequencies which can be heard by the ear or which the ear is made to hear.

Many measurements have been made to define the characteristics of the human ear by audiometric methods establishing audiometric curves which, for each frequency of a given frequency range from about 100 to 12,000 Hz, give the audition thresholds beyond which a given individual starts to hear the sound of the concerned measured frequency. These thresholds are defined by positive or negative energy levels measured in decibels with respect to a reference level chosen statistically after examination of a number of individuals considered normal from the hearing point of view.

As the spectrum of the voice of a given individual is markedly determined by the auditory spectrum, it can be concluded that the audition curve also gives in fact a picture of the phonation of this individual. This has been confirmed by experiments.

In other words, if a curve representing the frequency spectrum of the voice of an individual is established, there is found practically the audition curve of the individual. This curve can be termed "the phonation curve."

Now, other experiments have revealed that a number of individuals all possessing the same mother tongue have practically similar audition curves, which also means that they have similar phonation curves. Thus, the phonation curve of a French individual, for example, has on average a relatively high energy level of about 1,500 Hz, and the phonation curve of an English individual also has on average an energy level increasing from 2,000 Hz to 6,000 Hz. Now, it has been noticed that each language corresponds to a certain well-defined characteristic curve which can be established statistically by means of an audiometer.

By taking as a basis the results of these investigations, the object of the present invention is to provide a process and an apparatus whereby a given individual is gradually led to pronounce voluntarily a frequency spectrum adapted to the foreign language he desires to learn, and consequently to learn to speak this foreign language without accent.

The invention provides a process for accelerating the learning of languages whereby an individual is made to acquire a phonation curve pertaining to a foreign language to be learned, said process comprising converting the phonation curve formed by the vocal emissions of the individual, for example those resulting from the individual reading some written document, preferably in the foreign language to be learned, into electrical signals and, in a first stage of learning, modifying said phonation curve by a first selective filtering of said signals so as to obtain a first audition curve having a roughly constant energy level as a function of the frequency, which audition curve is made to be heard by the individual so as to enable the individual to acquire a first modified phonation curve similar to said first audition curve obtained, and, in the second stage of learning, modifying said first modified phonation curve of the individual by a second selective filtering of the electrical signals produced from said first modified phonation curve so as to obtain a second audition curve the form of which reproduces the phonation curve of the language to be learned, said second audition curve being made to be heard by the individual so as to cause him to acquire said phonation curve of the language to be learned.

According to a modification of the invention, the process may comprise, in a first stage of learning, not producing an audition curve of constant energy level but an audition curve in respect of which the energy levels of the essential frequencies are distinctly higher and/or lower than the levels of the corresponding frequencies of the phonation curve of the language to be learned.

By audition curve is meant here the curve that the individual receives through the process or the apparatus according to the invention.

According to another feature of the invention, the process further comprises reproducing, in the course of the entire procedure of learning, a sound recording audible to the individual, said recording comprising a series of vocal emissions, such as phonemes, words or phrases separated by silences during which the individual may repeat the vocal emissions.

Owing to the last mentioned feature the individual need not read a text to produce the vocal emissions.

The invention also provides an apparatus for carrying out the process defined hereinbefore, said apparatus comprising in combination, transducer means for converting the sound emitted by the individual into electrical signals, amplifying and filtering means comprising, for each language to be learned, at least a high-pass filter and a low-pass filter which are switchable in such manner as to furnish for each language to be learned at least two determined frequency characteristics corresponding to two respective consecutive learning stages, and reproducing means for converting the signals issuing from said amplifying and filtering means into sounds perceptible to the individual.

According to another feature, said apparatus further comprises means for restoring a recording connected to said amplifying and filtering means for converting said recording into sounds audible to the individual.

Further features and advantages of the invention will be apparent from the ensuing description with reference to the accompanying drawings.

Figure 1:
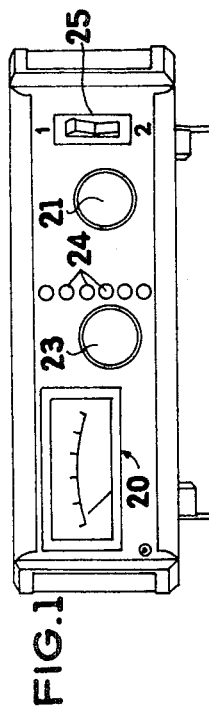
FIG. 1 is a front elevational view of the front face of a first embodiment of an apparatus for carrying out the process according to the invention.
Figure 2A:
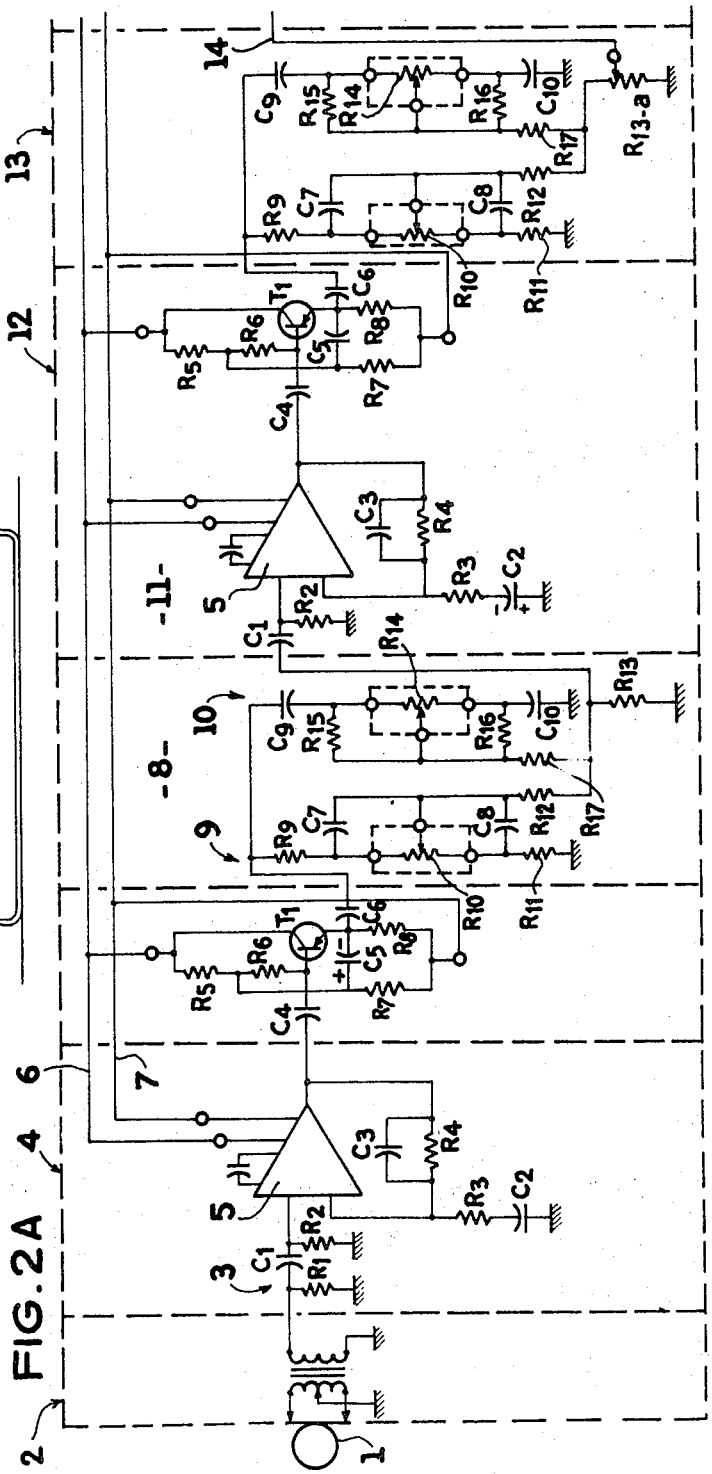
FIGS. 2A and 2B are the general circuit diagrams of the apparatus shown in FIG. 1.
Figure 2B:
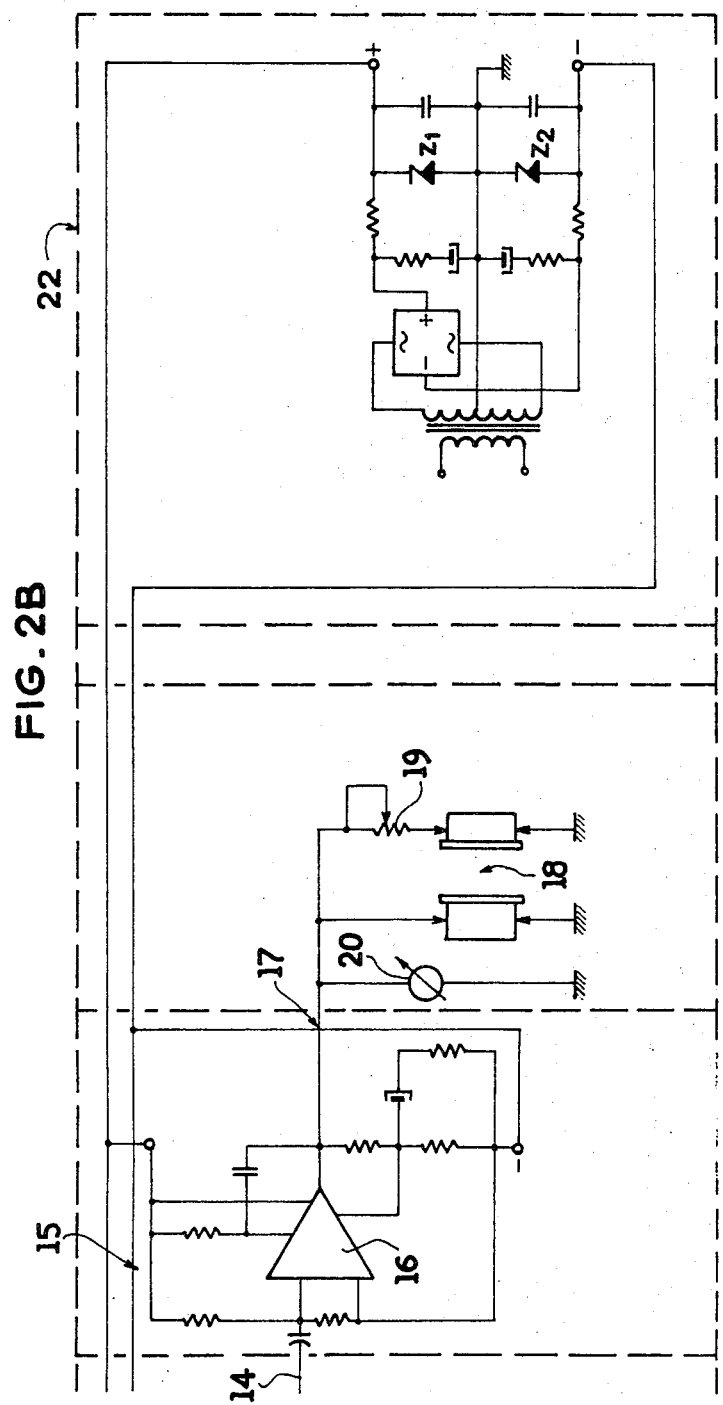
Figure 3:
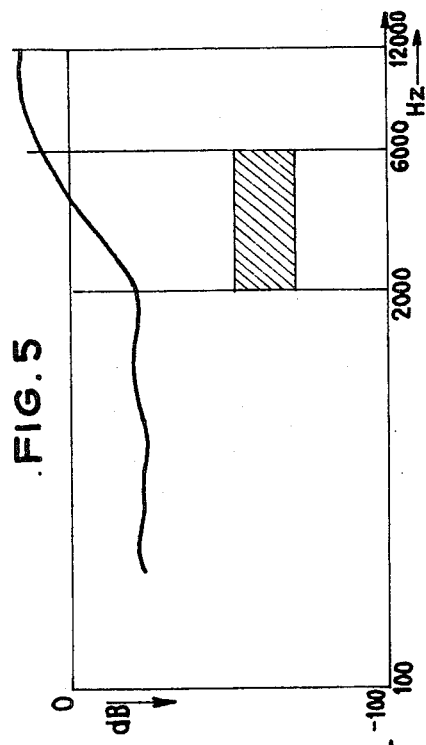
FIGS. 3–6 show curves of the frequency as a function of the energy level in decibels and illustrate the operation of the apparatus shown in FIG. 1.

With reference to FIGS. 1, 2A and 2B, a first embodiment of an apparatus according to the invention is shown to comprise a microphone 1 placed inside or outside the apparatus, and connected to an input transformer 2 for impedance matching. The transformer raises the voltage furnished by the microphone and matches the impedance of the latter to that of the input circuit 3 of a first amplifier stage 4 comprising an amplifier 5. The first input of the latter is connected through a capacitor $C_1$ to the transformer 2, the two terminals of the capacitor being connected to ground through two resistors $R_1$ and $R_2$. The second input of the amplifier 5 is connected to ground through a resistor $R_3$ and a capacitor $C_2$. This second input of the amplifier 5 is also connected to the output of the latter through a parallel circuit of a resistor $R_4$ and a capacitor $C_3$ constituting a negative feedback circuit. The output of the amplifier 5 is connected to an impedance matching circuit comprising a transistor $T_1$ mounted as an emitter follower. This stage is necessary for lowering the output impedance of the amplifier 5 in the known manner.

The base of the transistor $T_1$ is connected through a capacitor $C_4$ to the output of the amplifier 5 and, through two resistors $R_5$ and $R_6$, to a supply line 6 of positive voltage. The junction between the resistors $R_5$ and $R_6$ is connected through a resistor $R_7$ to a negative voltage supply line 7. This junction is furthermore connected to the emitter of the transistor $T_1$ through the capacitor $C_5$. The emitter of the transistor $T_1$ is also connected to the negative supply line 7 through a resistor $R_8$. The junction between the capacitor $C_5$ and the resistor $R_8$ is connected through a capacitor $C_6$ to a first low-impedance filtering stage 8. The filtering circuit 8 comprises two sections 9 and 10 adapted to filter respectively the low frequencies and high frequencies. The section 9 comprises a voltage divider having a resistor $R_9$ and adjustable resistive component $R_{10}$, described hereinafter, and a resistor $R_{11}$, the divider being connected between ground and the output of the impedance matching circuit 6. The junction between the resistor $R_9$ and the component $R_{10}$ is connected through a capacitor $C_7$ to a resistor $R_{12}$ which is connected to ground through a resistor $R_{13}$. The junction between the component $R_{10}$ and the resistor $R_{11}$ is connected to the resistor $R_{12}$ through a capacitor $C_8$.

The section 10, which is connected in parallel with the section 9 between the output of the impedance matching circuit 6 and the grounded resistor $R_{13}$, also has a voltage divider comprising a capacitor $C_9$, an adjustable resistive component $R_{14}$, described hereinafter, and a capacitor $C_{10}$, the divider being connected between the output of the circuit 6 and ground. The junction between the capacitor $C_9$ and the component $R_{14}$ is connected to a resistor $R_{15}$ and the junction between the component $R_{14}$ and the capacitor $C_{10}$ is connected to a resistor $R_{16}$. The resistors $R_{15}$ and $R_{16}$ are interconnected and connected to the resistor $R_{13}$ through a resistor $R_{17}$.

The output of the filtering circuit 8 appears at the terminals of the resistor $R_{13}$ and this output is applied to a second amplifier stage 11 whose output is connected to an impedance matching circuit 12 which is connected to a second filtering circuit 13.

As can be seen in FIG. 2, the circuits 11, 12 and 13 are identical to the circuits 4, 6 and 8 respectively and need not be described in detail. The same reference characters designate equivalent components.

The output of the filter circuit 13 in line 14 is applied to a power amplifier stage 15 comprising an amplifier 16 of conventional design which will not be described in detail. The output of the amplifier 16 in line 17 is applied to a pair of earphones 18 corresponding respectively to the left ear and right ear of the individual, the left ear phone being connected to the output of the amplifier 16 through a regulating potentiometer 19. The output of the amplifier 16 is also connected to ground through an indicator 20 for indicating the output level of the complete network (see also FIG. 1). This output level can be regulated by means of a potentiometer $R_{13a}$ which is part of the filter circuit 13. The control knob 21 of this potentiometer appears on the front panel of the apparatus. The supply lines 6 and 7 are connected to a supply circuit of conventional design 22 which will not be described in detail.

The adjustable resistive components $R_{10}$ and $R_{14}$, symbolically represented in the drawing by potentiometers, comprise in fact a plurality of potentiometers which are so interconnected as to be capable of being switched by the user of the apparatus. The switching of these potentiometers has two main purposes, namely the selection of the required foreign language to be learned and the selection of two modes of operation of the apparatus according to the two filtering configurations of the circuits 8 and 13. Thus, there are for each language two potentiometers in each of the sections 9 and 10 of the filter circuits 8 and 13 and this provides in all eight potentiometers per foreign language selected. The eight potentiometers are switchable in groups of four so as to make it possible to select the two modes of operation of the apparatus. The switches necessary for this can be controlled by means of the knob 23 (FIG. 1) for selecting the foreign language, this switch also controlling a series of indicator lights 24 placed next to the knob 23. The required mode of operation of the apparatus is selected by means of a knob 25. The circuitry of these switches presents no problem to those skilled in the art and have not been described in detail here. It is sufficient to indicate that each potentiometer employed is regulated once and for all to determine exactly the pass band of each filter section 9 or 10 and the exact reproduction of the frequency characteristic necessary for obtaining the desired effect of the apparatus.

The apparatus operates in the following manner:

The sound waves emitted by the user are converted into a variable electrical voltage by the microphone 1. The transformer 2 raises this voltage and matches the impedance of the microphone 1 to the impedance of the input circuit of the first amplifier stage 4. The latter linearly amplifies the signal with a wide pass band (for example from 10 Hz to 100 kHz, level - 3 db), low distorsion and high signal-to-noise ratio, easily achieved by employing for the amplifier 5 a high-quality integrated circuit. The signal issuing from the transformer 2 develops at the terminals of the resistor $R_1$ a voltage which is transmitted to the resistor $R_2$ through the capacitor $C_1$ and applied to the amplifier 5. There is obtained at the output of the latter a voltage which is amplified linearly in the audio-frequency range. The capacitor $C_3$, of low value, is intended to improve the signal-to-noise ratio of the amplifier stage 4. The resistors $R_3$ and $R_4$ determine the negative feedback of this amplifier and the capacitor $C_2$ serves to block the D.C. component of the signal.

The voltage obtained at the output of the amplifier 5 is transmitted to the base of the transistor $C_1$ through the capacitor $C_4$. The transistor $T_1$ transforms the output impedance of the amplifier 5 and adapts it to the input impedance of the filter circuit 8. The section 9 of the latter is adapted to raise or attenuate the low-pitched sounds below 1,000 Hz and the section 10 has for function to attenuate or raise the high-pitched sounds above 1,000 Hz.

The circuits 11, 12 and 13 have the same function as that previously described in respect of the circuits 4, 6 and 8.

The power amplifier 15 amplifies linearly the signal issuing from the filter circuit 13, the output power of this amplifier being sufficient to drive the earphones 18.

Owing to the presence of the potentiometer 19 and in accordance with the theory of the technique of audiology, it is possible to apply an increased power to the directing ear, namely the right ear in the right-handed individuals. It is also possible to incorporate a potentiometer in the supply line of the right earphone should the user be left-handed. The supply circuit furnishes a stabilized supply voltage owing to the presence of Zener diodes $Z_1$ and $Z_2$. It will be understood that this supply can be substituted for a battery unit which permits an independent operation of the apparatus.

As already mentioned, the filter circuits 8 and 13 determine the audition curves that a given individual employing the apparatus receives through the earphones 18 and he speaks into the microphone 1.

For a given foreign language, the individual possesses two modes of operation which he can select by means of the knob 25 (FIG. 1). The latter enables him to choose a first group of four potentiometers adjusted to afford a given response curve of the apparatus.

Figure 4:
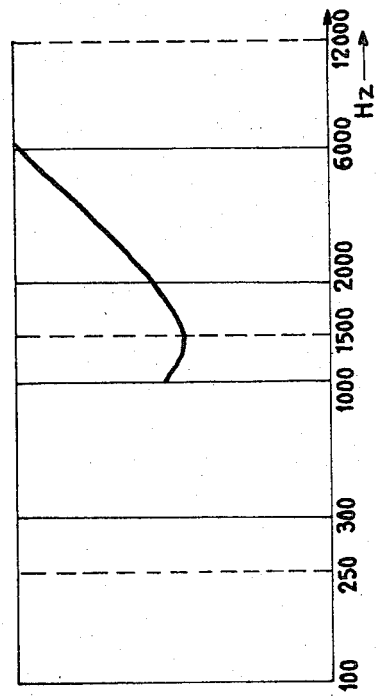

Assuming that the individual is French-speaking and desires to learn English, the knob 23 is first set to light up the indicator light corresponding to English. Then, the knob 25 is set to number 1 which switches the two filter circuits to a configuration corresponding to the curve shown in FIG. 4. This preparatory training has for purpose to excite the ear of the individual so that he is rendered auditorily sensitive to new frequencies.

The auditory apparatus of the individual is thus made progressively acquainted, for example during the first 5 hours of the exercises, with an audition curve whose energy level varies by no more than 10 db between 50 and 10,000 Hz. After this period of exercise his phonation curve changes progressively.

Figure 5:
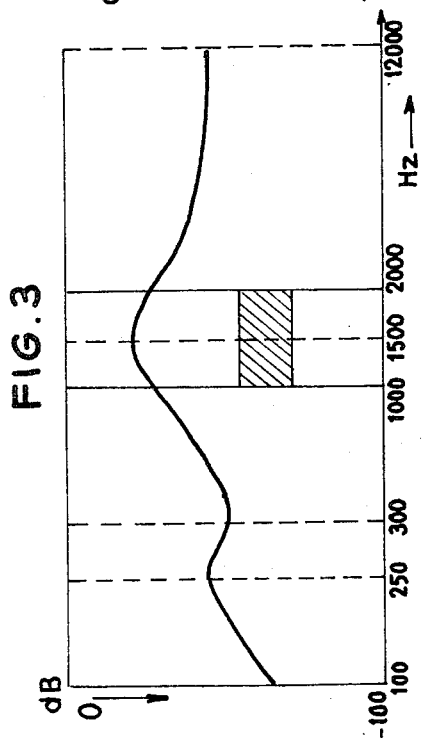
Figure 6:
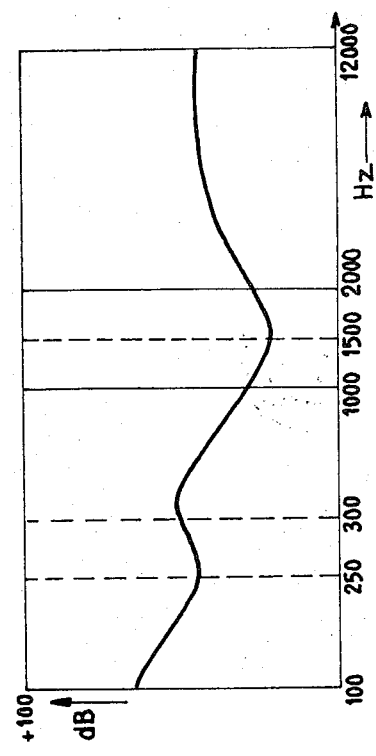

The apparatus can also be arranged in such manner as to reproduce the curve shown in FIG. 6 when the knob 25 is set to number 1. The curve shown in FIG. 6, which corresponds to the learning of English, shows that the level of frequencies above 2,000 Hz is favoured, the level being higher than that of the normal English curve shown in FIG. 5. Thus the ear of the individual can be excited beyond the level of the normal frequencies of the curve of the language to be learned.

Thereafter, in t e second stage of learning, which can last between 30 and 50 hours, the individual sets the knob 25 to number 2 which brings into circuit the second group of potentiometers of the filter circuits 8 and 13. The frequency characteristic then corresponds to the curve shown in FIG. 5 which represents the normal phonation curve of an English individual. Once again, the individual gradually learns to imitate the modified audition curve by means of his own transformed phonation curve.

Note that the transformation of the phonation curve is not a irreversible transformation. On the contrary, the individual is entirely free to use his own voice as he wishes. The apparatus according to the invention therefore in no way adversely affects the phonation curve the individual initially had, it being understood that learning a language is a conditioning process. Moreover, the user is unconscious of the effect of this apparatus.

Figure 7:
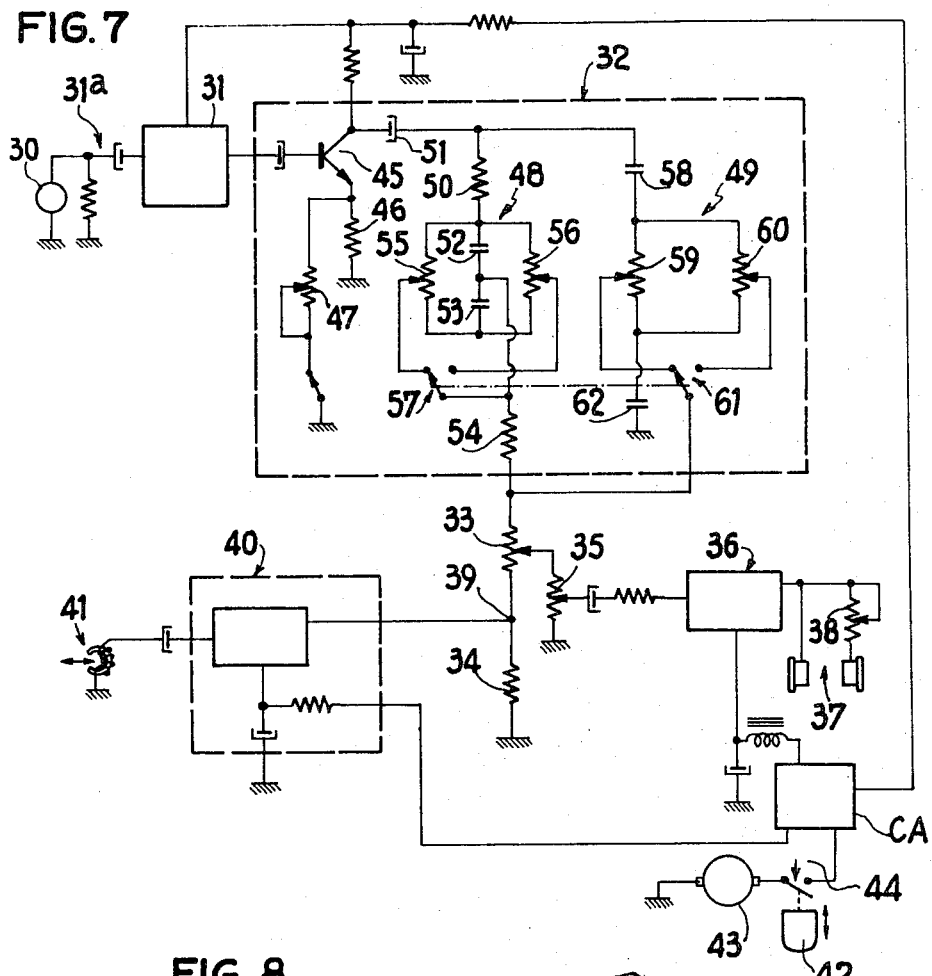
FIG. 7 is a circuit diagram of a second embodiment of an apparatus for carrying out the process according to the invention.
Figure 8:
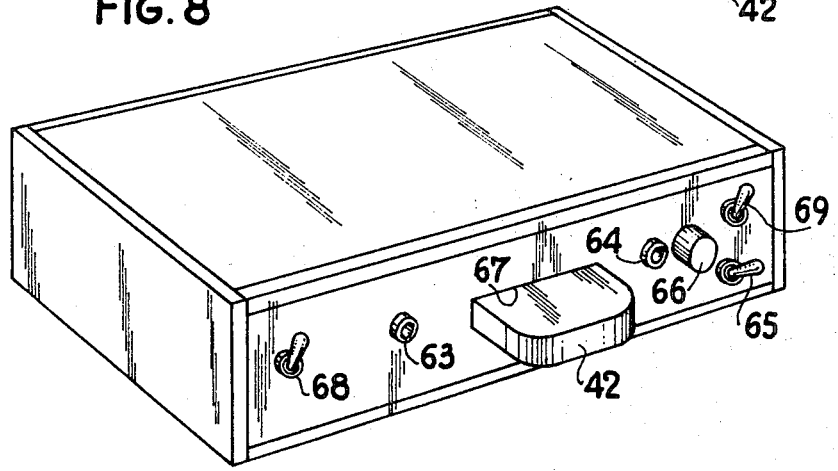
FIG. 8 is a front elevational view of the second embodiment of the apparatus.

With reference now to FIGS. 7, 8 and 9, it can be seen that the second embodiment of the apparatus according to the invention comprises a microphone 30 which is connected to a preamplifier 31 through a matching circuit 31a. The preamplifier 31 has a linear amplification characteristic. Its output is applied to a filtering circuit 32 a detailed description of which will be given hereinafter.

The output of the filtering circuit 32 is applied to a potentiometer 33 which is grounded through a resistor 34. The slider of the potentiometer 33 is connected to another potentiometer 35 which constitutes the control of the output levels of the apparatus. The slider of the potentiometer 35 is connected to the input of a linear amplifier 36 whose output is connected to a pair of earphones 37 through another potentiometer 38 which is connected in series with one of the earphones.

The junction point 39 between the potentiometer 33 and the resistor 34 is connected to the output of a preamplifier 40 whose input is connected to a magnetic reproducing head 41 which is adapted to reproduce a magnetic tape contained in a cassette 42 that the user can introduce into the apparatus.

The apparatus further comprises a stabilized supply circuit CA which supplies the supply voltages necessary for the various circuits of the apparatus. It supplies in particular the supply voltage of a motor 43 driving the magnetic tape of the cassette 42 through a switch 44 which is actuated as soon as the cassette 42 is in position in the apparatus.

The amplifiers 31, 36 and 40 are of conventional type and therefore need not to be described in detail. On the other hand, the filtering circuit 32 will now be completely described.

The output of the linear preamplifier 31 is first applied to the base of an impedance matching transistor 45 whose emitter is grounded through a resistor 46 and connected to a calibrating potentiometer 47 which regulates the level of the reference signal for a frequency of 1,000 Hz. The collector of the transistor 45 is connected to two filtering sections 48, 49, one being respectively adapted to regulate the amplification curve of the apparatus for the low frequencies whereas the other 49 serves to calibrate the amplification curve for the high frequencies. The filter section 48 comprises a resistor 50 connected to the collector of the transistor 45 through a capacitor 51 and to two capacitors 52 and 53 in series whose junction point is connected to a resistor 54 which is connected to the aforementioned potentiometer 33. The series connection of the capacitors 52 and 53 is shunted by two potentiometers 55 and 56 the sliders of which are respectively connected to the fixed contacts of a switching section 57 whose moving contact is connected to the resistor 54. The potentiometers 55 and 56 are therefore switchable and may thus determine two response curves of the filter section 48.

The section 49 comprises a capacitor 58 which is connected to the capacitor 51 and two potentiometers 59 and 60 in parallel whose sliders are also connected to the fixed contacts of another switching section 61 whose moving contact is connected to the potentiometer 33. The terminal of the parallel connection of the potentiometers 59 and 60 opposed to the capacitor 58 is connected to another capacitor 62 which is grounded. Note that the switching sections 57 and 61 are actuated together. The signal issuing from the filter 32 is mixed with the signal from the preamplifier 40 amplifying the signal coming from the reproducing head 41 on the point 39, the potentiometer 33 serving to balance the levels of the signals from the microphone 30 and from the reproducing head 41. This signal, after having undergone regulation is amplified and applied to the earphones 37.

The front panel of the apparatus shown in FIG. 8 comprises a microphone socket 63, an earphone socket 64, an off-on switch 65, a volume control knob 66 mechanically connected to the potentiometer 35, an insertion slot 67 for the cassette 42, a control knob 68 for the switching sections 57 and 61 and a switch 69 controlling, through a circuit which has not been shown, the reproduction of either of the tracks recorded on the tape of the cassette 42.

Note that it is also possible to provide a circuit of known type so that the signal picked up by the microphone 30 is recorded directly on the tape in the cassette 42 so that the results of the individual or student may be judged by the latter or by a teacher.

It will be observed that this tape contains vocal emissions constituted, for example, by phonemes, words or phrases which are spaced apart in time so that the user of the apparatus may recite these vocal emissions during the silences between the consecutive emissions.

Note also that these vocal emissions do not pass through the filter 32 and therefore reach the earphones 37 with no modification.

The operation of the apparatus shown in FIGS. 7 and 8 is substantially the same as that of the apparatus described with reference to FIGS. 1–6 except that the apparatus shown in FIGS. 7 and 8 enables the individual learning a foreign language to hear pre-recorded vocal emissions so that he does not have to read a text including the data pertaining to these vocal emissions. Consequently, the user can fully concentrate on his learning work which still more accelerates the learning.

A magnetic tape device has been described by way of the reproducing apparatus. It must be understood that this device may be replaced by any other recording base, such as a disc record or the like. In this case, the record player may be provided, if desired, in the apparatus. If it is not provided in the apparatus, the latter has a socket for connecting the record player at point 39 of the circuit just described.

In the course of the first learning stage, the individual or student places the switching sections 57 and 61 in position "1", which imparts to the filter 32 a response curve corresponding to an audition curve, reproduced from the phonation curve produced by the student in the microphone 30, which is symmetrical relative to the general phonation curve of the language to be learned. This stage of learning may for example last from several hours to ten hours.

In the course of the second stage of learning, the student places the switching sections 57 and 61 in position "2" as a result of which the band pass of the filter 32 permits obtaining from the phonation curve introduced by the student in the microphone 30 an audition curve which corresponds to the language to be learned. This second stage of learning may for example last from ten to fifty hours.

When the student employs the recording on the magnetic tape in the cassette 42, he starts up this tape by introducing the cassette 42 in the apparatus through the slot 57.

He can then listen to this recording through his earphones and repeat the passages of this recording in the microphone 30 through the earphones 37 during both the first stage and second stage of learning.

Having now described my invention what I claim as new and desire to secure by Letters Patent is:

1. A process for accelerating the learning of languages whereby an individual is made to acquire a phonation curve pertaining to a foreign language to be learned, said process comprising converting into electrical signals an original phonation curve which is different from a characteristic curve of a language to be learned and which is formed by vocal emissions of an individual constituted by the recitation of phrases in the language to be learned and, in a first stage of learning extending for a first period of time for modifying said original phonation curve by a first selective filtering of said signals so as to obtain a first audition curve having a substantially constant energy level as a function of frequency, which audition curve is made to be heard by the individual so as to enable the individual to acquire a first modified phonation curve similar to said first audition curve obtained, and, in a second stage of learning subsequent to said first stage of learning extending for a second period of time during which the individual still recites phrases in the language to be learned, modifying said first modified phonation curve of the individual by a second selective filtering of the electrical signals produced from said first modified phonation curve so as to obtain a second audition curve the form of which reproduces the characteristic phonation curve of the language to be learned, said second audition curve being made to be heard by the individual so as to cause him to acquire said characteristic phonation curve of the language to be learned.

2. A process as claimed in claim 1, wherein the first selective filtering produces an audition curve which is symmetrical to the phonation curve of the mother tongue of the individual relative to a reference energy level constituted by said substantially constant energy level.

3. A process as claimed in claim 1, further comprising restoring in the course of the entire learning procedure a sound recording audible to the individual, said sound recording comprising a series of vocal emissions such as phonemes, words or phrases separated by silences during which the individual may repeat said vocal emissions.

4. A process as claimed in claim 3, further comprising recording the vocal emissions of the individual during the silences between the vocal emissions of said recording.

5. A process for accelerating the learning of languages whereby an individual is made to acquire a phonation curve pertaining to a foreign language to be learned, said process comprising converting into electrical signals an original phonation curve which is different from the characteristic curve of the language to be learned and which is formed by vocal emissions of the individual constituted by the recitation of phrases in the language to be learned and in a first stage of learning extending for a first period of time for modifying said original phonation curve by a first selective filtering of said signals so as to obtain a first audition curve whose energy levels of essential frequencies are distinctly higher and/or lower than those of the corresponding frequencies of the phonation curve of the language to be learned, said audition curve being heard by the individual so that the individual acquires a first modified phonation curve similar to said first audition curve obtained, and, in a second stage of learning subsequent to said first stage of learning, extending for a second period of time during which the individual still recites phrases in the language to be learned, modifying the first modified phonation curve of the individual by a second selective filtering of the electrical signal produced by said first modified phonation curve so as to obtain a second audition curve whose form reproduces the characteristic phonation curve of the language to be learned, said second audition curve being heard by the individual whereby the individual is made to acquire said phonation curve of the language to be learned.

* * * * *